(12) United States Patent
Li et al.

(10) Patent No.: US 8,400,014 B2
(45) Date of Patent: Mar. 19, 2013

(54) POWER CONTROL SYSTEM AND METHOD FOR CHARGING BATTERY USING FLUCTUATING POWER SOURCE

(75) Inventors: Fu Yu Li, Azusa, CA (US); Kalvin Chen, San Marino, CA (US)

(73) Assignee: American Reliance, Inc., El Monte, CA (US)

( * ) Notice: Subject to any disclaimer, the term of this patent is extended or adjusted under 35 U.S.C. 154(b) by 211 days.

(21) Appl. No.: 12/683,019

(22) Filed: Jan. 6, 2010

(65) Prior Publication Data

US 2011/0163601 A1     Jul. 7, 2011

(51) Int. Cl.
*H02J 3/32* (2006.01)

(52) U.S. Cl. .......... 307/48; 307/64; 307/65; 307/66; 323/226

(58) Field of Classification Search .......... 307/64, 307/48; 323/226
See application file for complete search history.

(56) References Cited

U.S. PATENT DOCUMENTS

| | | | | |
|---|---|---|---|---|
| 5,610,451 A * | 3/1997 | Symonds | ............. | 307/66 |
| 7,274,116 B2 * | 9/2007 | Inoue et al. | ............. | 307/100 |
| 7,292,006 B2 * | 11/2007 | Horiuchi | ............. | 322/7 |
| 7,642,677 B2 * | 1/2010 | Harris | ............. | 307/131 |
| 7,679,943 B2 * | 3/2010 | O'Bryant et al. | ............. | 363/65 |

* cited by examiner

*Primary Examiner* — Jared Fureman
*Assistant Examiner* — Alfonso Perez Borroto
(74) *Attorney, Agent, or Firm* — Haynes and Boone LLP

(57) ABSTRACT

Systems and methods are disclosed for improving power efficiency in battery-charging DC power control systems when a power source input voltage is fluctuating. Power is received from the power sources in the form of AC or DC electrical energy and is controlled and regulated by the DC power control systems into DC voltages for charging batteries and/or for driving output loads. Input voltage from the power sources may fluctuate and may drop below a voltage level required to charge the batteries, resulting in a loss in power conversion efficiency. Embodiments of the present disclosure detect low input voltage, boost the low input voltage to a sufficient voltage level for charging the batteries, and manage the distribution of the battery power and input power to the loads to increase power efficiency while meeting load power demands.

18 Claims, 5 Drawing Sheets

POWER CONTROL SYSTEM AND METHOD FOR CHARGING BATTERY USING FLUCTUATING POWER SOURCE

CROSS REFERENCE TO RELATED APPLICATION

This application incorporates by reference in entirety the contents of U.S. patent application Ser. No. 12/128,408 filed on May 28, 2008.

TECHNICAL FIELD

The present disclosure relates generally to power control systems. More particularly, the present disclosure relates to systems and methods for controlling power transfer in a DC (direct current) power system to improve power efficiency and increase battery charging time when a power source input voltage is fluctuating.

BACKGROUND

Conventional DC power systems include a power source, DC power controller, and batteries. Conventional DC power controllers are well known. They typically use quick-charge methods, voltage regulation/conversion, and/or battery protection to prolong battery operational life and to accelerate charging time. Typical systems utilize switches between the power source and the battery with a power controller pulse width modulating (PWM) the switches to achieve power transfer from the power source to the batteries. In such systems, the batteries are quickly charged by the power source, are discharged to power a load, and then are quickly charged again.

Although conventional DC power control systems have proven generally suitable for their intended purposes, they possess inherent deficiencies which detract from their overall effectiveness and desirability. For example, conventional DC power control systems do not effectively use power from the power source when the power source voltage fluctuates and drops below a voltage level required to charge the batteries. Ineffective use of fluctuating power source voltage results in a loss in power conversion efficiency both in charging the battery and in driving the load. Thus, there is a need to increase the power efficiency of a DC power control system that receives a fluctuating power source voltage.

BRIEF SUMMARY

Systems and methods are disclosed herein to provide improved power transfer in a DC power control system comprising a power source, a switch network, a controller, and a plurality of batteries.

In accordance with an example of the present disclosure, the DC power control system consists of a voltage booster, a power distribution network, and a battery. The voltage booster selectively boosts a DC voltage to a higher voltage to supply an input voltage to the power distribution network. The power distribution network manages the distribution of power from the input voltage to drive a load voltage and to charge the battery, and also manages the discharge of the battery power to drive the load voltage to supplement the power from the input voltage.

In accordance with another example of the present disclosure, the DC power control system is partitioned into a fixed controller base and a removable controller housing to facilitate removal and attachment of the DC control system from/to a platform such as an electric bike (e-bike). The fixed controller base has a fastening fixture, an input connection, an output connection, one or more base contacts, and a base structure to engage with a counterpart structure of the removable controller housing. The fastening fixture is used to secure the fixed controller base to a-frame of the platform. The input connection supplies input power to the DC power control system. The output connection supplies output power from the DC power control system to a load. The base contacts electrically connect with a set of housing contacts of the removable controller housing when the fixed controller base is engaged with the removable controller housing. The removable controller housing has the counterpart structure for engaging with the base structure of the fixed controller base and the housing contacts for connecting to the base contacts of the fixed controller base.

In accordance with another example of the present disclosure, the DC power control method consists of selectively boosting a DC voltage when the DC voltage is less than a boost threshold to drive an input voltage, determining the presence of a load, and supplying power from the input voltage to drive a load voltage for the load. The DC power control method also selectively charges a battery from the input voltage if the power from the input voltage is sufficient to drive the load voltage, and selectively discharges power from the battery to drive the load voltage to supplement power from the input voltage if the power from the input voltage is insufficient to drive the load voltage.

These and other objects and advantages of embodiments of the present disclosure will be more fully understood by reference to the following detailed description when considered in conjunction with the following drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed for improving power efficiency in battery-charging DC power control systems when a power source input voltage is fluctuating. In DC power control systems, power may come from power sources such as solar arrays, wind turbines, grid ties or hand-crank devices. Power is received from the power sources in the form of AC or DC electrical energy and is controlled and regulated by the DC power control systems into DC voltages for charging batteries and/or for driving output loads. Input voltage from the power sources may fluctuate and may drop below a voltage level required to charge the batteries, resulting in a loss in power conversion efficiency. Embodiments of the present disclosure detect low input voltage, boost the low input voltage to a sufficient voltage level for charging the batteries, and manage the distribution of the battery power and input power to the loads to increase power efficiency while meeting load power demands.

Figure 1:
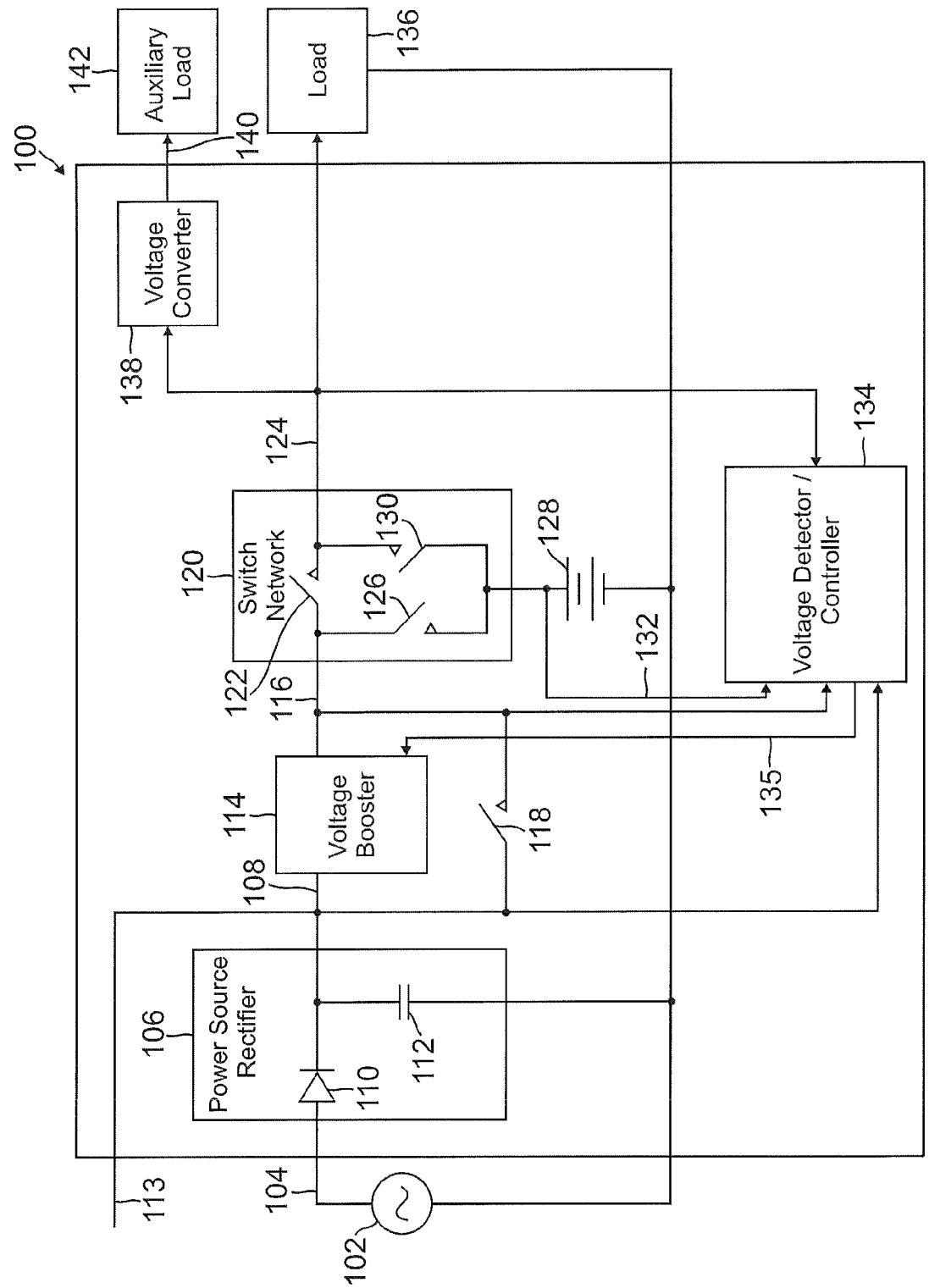
FIG. 1 is a block diagram of a DC power control system 100 for use in an electric bike (e-bike) according to one or more exemplary embodiments of the present disclosure.

FIG. 1 is a block diagram of a DC power control system 100 for use in an electric bike (e-bike) according to one or more exemplary embodiments of the present disclosure. The power control system 100 receives power from a hub generator 102 that is mounted on a wheel hub of the e-bike. The hub generator 102 generates an AC power source voltage 104 from the rotating motion of the wheel. Alternatively, the power control system 100 may receive its power from power sources such as a wind turbine mounted on the e-bike where the wind turbine generates AC voltage from wind energy.

A power source rectifier 106 is used to rectify the AC power source voltage 104 into a DC rectified voltage 108 required by the DC power control system 100. The power source rectifier 106 consists of a rectifier diode 110 and a rectifier capacitor 112. Alternatively, other types of power source rectifier 106 may be used. Additionally, as an alternative to using AC power source voltage 104, a DC power source voltage 113 may also be used to power the DC power control system 100. When using the DC power source voltage 113, the power source rectifier 106 is bypassed and the DC power source voltage 113 is used in place of the rectified voltage 108.

If the rectified voltage 108 or the DC power source voltage 113 is lower than a threshold voltage, a voltage booster 114 is used to boost the rectified voltage 108 or the DC power source voltage 113 to a higher voltage. The threshold voltage may be set at a minimum voltage level required to charge a battery For example, for a 12V battery, the threshold voltage may be set at 12V to boost the rectified voltage 108 when it is lower than 12V to higher than 12V. The higher voltage is used as a switch network input voltage 116 to charge the battery. On the other hand, if the rectified voltage 108 is higher than the threshold voltage, the voltage booster 114 outputs the rectified voltage 108 as the switch network input voltage 116.

Alternatively, a voltage booster bypass switch 118 may be used in conjunction with the voltage booster 114. When the rectified voltage 108 or the DC power source voltage 113 is lower than the threshold voltage, the voltage booster 114 is enabled to boost the rectified voltage 108 or the DC power source voltage 113 to drive the switch network input voltage 116, and the voltage booster bypass switch 118 is in the open position. Otherwise, if the rectified voltage 108 or the DC power source voltage 113 is higher than the threshold voltage, the voltage booster 114 is decoupled from the switch network input voltage 116, and the voltage booster bypass switch 118 is closed to route the rectified voltage 108 or the DC power source voltage 113 to the switch network input voltage 116.

A switch network 120 is used to connect the switch network input voltage 116 to a load or a battery. For example, the switch network 120 consists of a direct output switch 122 to connect the switch network input voltage 116 to a load driving voltage 124, a battery charge switch 126 for routing some or all of the power from the switch network input voltage 116 to charge a 12V battery 128, and a battery discharge switch 130 to connect a battery voltage 132 from the 12V battery 128 to the load driving voltage 124.

A voltage detector and controller 134 detects voltage levels within the power control system 100, controls the voltage booster 114, manages the distribution of power from the switch network input voltage 116 to a load 136 through the load driving voltage 124, and also manages the charging/discharging to/from the 12V battery 128. Specifically, the voltage detector and controller 134 detects voltages of the rectified voltage 108, the switch network input voltage 116, the battery voltage 132, and the load driving voltage 124 to control the voltage booster 114, to determine the position of the switches in the switch network 120, and to control the voltage booster bypass switch 118 if it is present.

The voltage detector and controller 134 controls the voltage booster 114 through a voltage booster enable signal 135 to either boost the rectified voltage 108 if the rectified voltage 108 is below the 12V threshold or to leave the rectified voltage 108 as is. Alternatively, when the voltage booster bypass switch 118 is used in conjunction with the voltage booster 114, the voltage booster enable signal 135 enables the voltage booster 114 to boost the rectified voltage 108 and to drive the switch network input voltage 116 if the rectified voltage 108 is below the 12V threshold. The voltage booster enable signal 135 also puts the voltage booster bypass switch 118 in the open position. Otherwise, the voltage booster enable signal 135 decouples the voltage booster 114 from the switch network input voltage 116 and closes the voltage booster bypass switch 118 to connect the rectified voltage 108 to the switch network input voltage 116.

The voltage detector and controller 134 also closes the direct output switch 122 to connect the switch network input voltage 116 to the load driving voltage 124 if the load 136 is present. The load driving voltage 124 is nominally at 12V. If the load driving voltage 124 drops below a desired threshold, indicating that the power from the switch network input voltage 116 is not enough to support the power demand of the load 136, the voltage detector and controller 134 closes the battery discharge switch 130 to discharge the 12V battery 128 to power the load 136. At the same time, the battery charge switch 126 is opened to disable charging of the 12V battery 128. On the other hand, if the load driving voltage 124 is above the desired threshold, indicating that the power from the switch network input voltage 116 is enough to drive the load 136, the voltage detector and controller 134 opens the battery discharge switch 130 and closes the battery charge switch 126 to distribute some power from the switch network input voltage 116 to charge the 12V battery 128.

The load 136 on the e-bike runs on 12V and may consist of such fixtures as a head light, a tail light, turn signal lights, etc. In addition, a voltage converter 138 is used to convert the nominal 12V of the load driving voltage 124 to a voltage converter output voltage 140 to drive an auxiliary load 142 that requires an input voltage different from the nominal 12V. For example, the voltage converter 138 may output 5V as the voltage converter output voltage 140 to drive the auxiliary load 142 that may consist of a charger for a cell phone, a GPS, or other portable devices.

Figure 2:
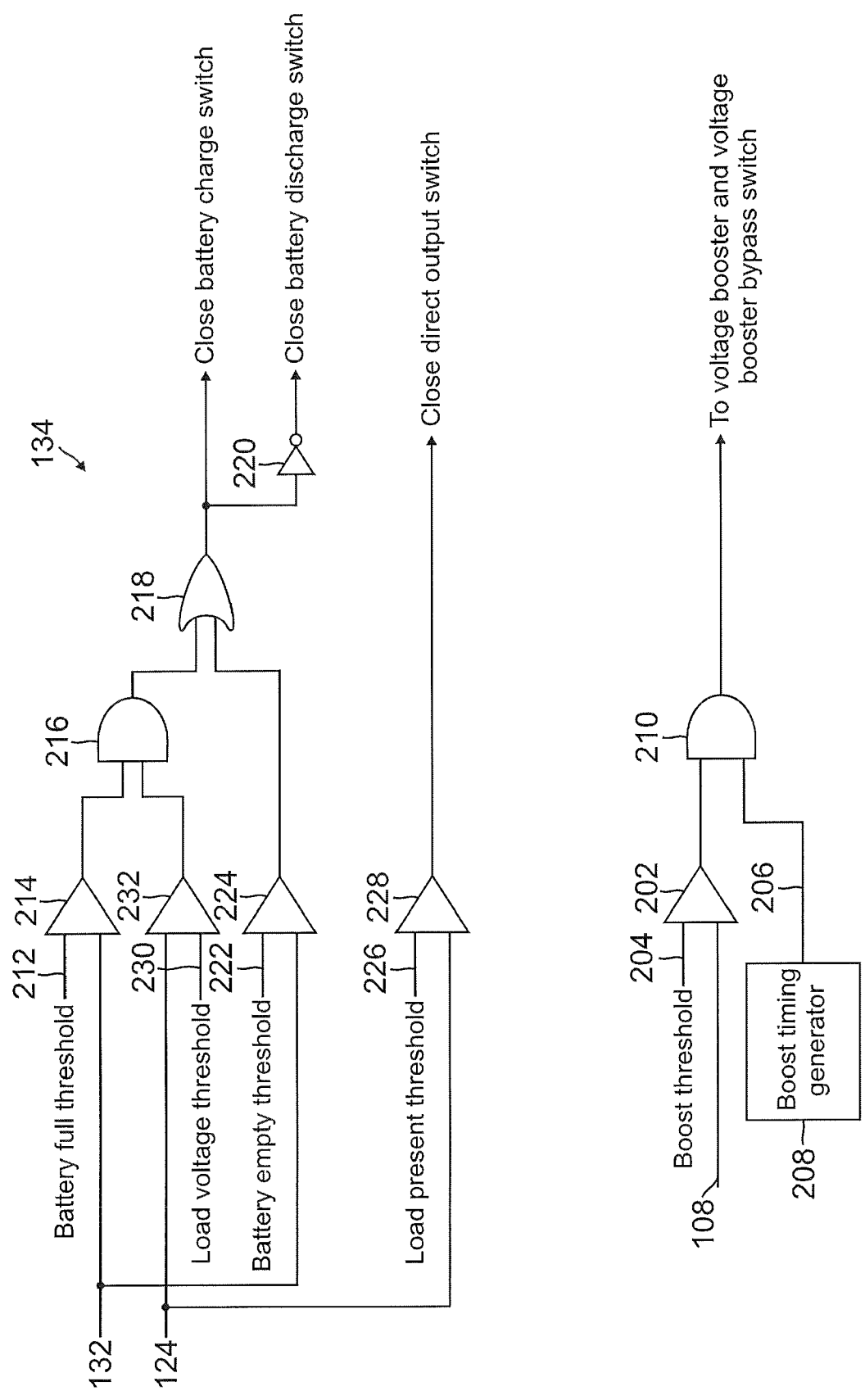
FIG. 2 is a block diagram of the voltage detector and controller 134 of FIG. 1 for use in an electric bike (e-bike) according to one or more exemplary embodiments of the present disclosure.

FIG. 2 is a block diagram of the voltage detector and controller 134 of FIG. 1 for use in an electric bike (e-bike) according to one or more exemplary embodiments of the present disclosure. The operation of the DC power control system 100 will be described in some details with reference to FIGS. 1 and 2. Referring to FIG. 1, the hub generator 102 mounted on the wheel hub of the e-bike generates an AC power source voltage 104 with a RMS voltage of 6V. The AC power source voltage 104 is rectified by the power source rectifier 106 to a DC voltage at the rectified voltage 108 output. The DC voltage of the rectified voltage 108 is proportional to the rotation speed of the wheel hub, which is proportional to the speed of the e-bike. That is, as the speed of the e-bike increases, the rectified voltage 108 also increases. In order to use the rectified voltage 108 to charge the 12V battery 128, the rectified voltage has to be greater than the battery voltage 132. However, at low speed, the rectified voltage 108 may not be greater than the battery voltage 132, such as when the e-bike is traveling at less than 8 kilometers/hour. To overcome this, the voltage booster 114 boosts the rectified voltage 108 to a higher voltage for use as the switch network input voltage 116.

Referring to FIG. 2, the voltage detector and controller 134 compares the rectified voltage 108 to an adjustable boost threshold 204 which is set at the nominal battery voltage of 12V using the boost threshold comparator 202. If the rectified voltage 108 is below the boost threshold 204, the boost threshold comparator 202 triggers to enable the voltage booster 114. The control of the voltage booster 114 may be further gated by a boost timing signal 206. The boost timing signal 206 is a square wave signal of a certain frequency generated by a boost timing generator 208. It is used to gate the output of the boost threshold comparator 202 through a boost gate 210 so that the voltage booster 114 is enabled at a 50% duty cycle. Alternatively, the boost timing generator 208 may generate the boost timing signal 206 with other on-time characteristics to enable the voltage booster 114 with a different duty cycle. The output of the boost gate 210 enables the voltage booster 114 to boost the rectified voltage 108 to a higher voltage for use as the switch network input voltage 116 and may also control the voltage booster bypass switch 118 when it is present.

Referring back to FIG. 1, when the switch network input voltage 116 is boosted to be higher than the battery voltage 132, the switch network input voltage 116 may be used to charge the 12V battery 128 through the battery charge switch 126. The boosted voltage may also be used to drive the load 136 through the direct output switch 122. Therefore, by boosting the low rectified voltage 108 to a higher voltage, the length of time that the 12V battery 128 is charging is increased and the power to the load 136 is also enhanced, thus increasing the power efficiency of the DC power control system 100 when the rectified voltage 108 from the hub generator 102 is fluctuating.

In addition to increasing the time that the 12V battery 128 is charging, a boosted voltage may also allow the 12V battery 128 to become fully charged faster. For example, the adjustable boost threshold 204 of FIG. 2 may be set at higher than the nominal battery voltage of 12V. Thus, even when the e-bike is traveling at faster than 8 Km/hour and the rectified voltage 108 is greater than the battery voltage 132, the voltage detector and controller 134 may enable the voltage booster 114 to boost the rectified voltage 108 even higher. The boosted voltage at the switch network input voltage 116 may be used to charge the 12V battery 128 through the battery charge switch 126. The result is that the 12V battery 128 may become fully charged faster using the boosted voltage than if the rectified voltage 108 has been directly used to charge the 12V battery 128. Thus, by adjusting the boost threshold 204, the voltage detector and controller 134 has the flexibility to charge the 12V battery 128 when the rectified voltage 108 is lower than the battery voltage 132, and also to reduce the time it takes to charge the 12V battery 128 when the rectified voltage 108 is higher than the battery voltage 132.

As the e-bike gains in speed and the rectified voltage 108 rises it will exceed the boost threshold 204 in the boost threshold comparator 202 of FIG. 2. The voltage detector and controller 134 will disable the voltage booster 114 and may close the voltage booster bypass switch 118 to make the switch network input voltage 116 the same as the rectified voltage 108. In addition to using a voltage that has been rectified from the AC power source voltage 104, the voltage booster 114 may also use a DC power source voltage 113 such as a photovoltaic cell mounted on the e-bike that converts solar energy into DC electrical energy for use by the DC power control system 100.

In addition to comparing the rectified voltage 108 with the boost threshold 204 for enabling the voltage booster 114, the voltage detector and controller 134 also uses other thresholds in comparators for determining the state of the direct output switch 122, the battery charge switch 126, and the battery discharge switch 130. Initially, the direct output switch 122 is open, the battery charge switch 126 is closed to charge the 12V battery 128, and the battery discharge switch 130 is open. It is noted that the state of the battery charge switch 126 is opposite from the state of the battery discharge switch 130 so that the 12V battery 128 may be either charging or discharging, but not both.

Referring to FIG. 2, to control the battery charge switch 126, the battery voltage 132 is compared against a battery full threshold 212 with a battery full comparator 214 to determine if the 12V battery 128 has been fully charged. If the battery voltage 132 exceeds the battery full threshold 212, indicating that the 12V battery 128 is fully charged, the voltage detector and controller 134 will open the battery charge switch 126 to stop the 12V battery 128 from charging any further through logic gates 216 and 218. When the battery charge switch 126 is open, a switch inverter 220 closes the battery discharge switch 130 to drive the battery voltage 132 onto the load driving voltage 124. Conversely, the battery voltage 132 is compared against a battery empty threshold 222 with a battery empty comparator 224 to determine if the 12V battery 128 is nearly drained. If the battery voltage 132 drops below the battery empty threshold 222, the battery empty comparator 224 triggers to indicate that the 12V battery 128 is low in power. The voltage detector and controller 134 will open the battery discharge switch 130 to prevent the 12V battery 128 from discharging any further. The battery charge switch 126 is then closed to charge the 12V battery 128 from the switch network input voltage 116.

To control the direct output switch 122, the load driving voltage 124 is also compared against a load present threshold 226 with a load present comparator 228 to determine if there is a load 136. Assume initially that there is no load and the 12V battery 128 is fully charged. The direct output switch 122 is open, the battery charge switch 126 is also open, and the battery discharge switch 130 is closed to drive the battery voltage 132 onto the load driving voltage 124. If the load 136 comes online, such as when a user switches on the head light and the tail light on the e-bike, the load driving voltage 124 may dip as the load starts to draw power from the 12V battery 128. The load present threshold 226 may thus be set to indicate the presence of the load 136 by detecting when the load driving voltage 124 drops below the load present threshold 226. When this condition occurs, the load present comparator 228 triggers. The voltage detector and controller 134 closes the direct output switch 122 to drive the switch network input voltage 116 onto the load driving voltage 124. Thus, when the 12V battery 128 is fully charged and the load present comparator 228 detects the presence of the load 136, both the switch network input voltage 116 and the battery voltage 132 are used to drive the load 136.

When the 12V battery 128 is not fully charged and therefore is charging, the voltage detector and controller 134 determines whether the 12V battery 128 should discharge to supplement the power from the switch network input voltage 116. To manage the distribution of power to the load 136, the load driving voltage 124 is compared against a load voltage threshold 230 with a load voltage comparator 232 to determine if there is sufficient power on the switch network input voltage 116 to drive the load 136. For example, initially, the load driving voltage 124 may exceed the load voltage threshold 230, causing the load voltage comparator 232 to trigger to indicate that the switch network input voltage 116 is capable of driving the load 136. The battery charge switch 126 is closed through logic gates 216 and 218 to continue charging the 12V battery 128 and the battery discharge switch 130 is open through the switch inverter 220.

As the power demand of the load 136 increases, such as when a user switches on a second head light on the e-bike, the load driving voltage 124 may decrease such that it drops below the load voltage threshold 230. The load voltage comparator 232 stops triggering to indicate that the switch network input voltage 116 does not have sufficient power to drive the increased power demand of the load 136. The voltage detector and controller 134 then closes the battery discharge switch 130 and opens the battery charge switch 126 if the 12V battery 128 is not low in power as indicated by the battery empty comparator 224 not triggering. Closing the battery discharge switch 130 allows the battery voltage 132 to supplement the switch network input voltage 116 to drive the load driving voltage 124, allowing the load 136 to draw power from both the hub generator 102 and the 12V battery 128.

However, if the load 136 continues to draw more power than the switch network input voltage 116 and the battery voltage 132 can provide, the 12V battery 128 may be sufficiently discharged such that the battery voltage 132 drops below the battery empty threshold 222. The battery empty comparator 224 triggers to indicate that the 12V battery is almost fully drained. To prevent the 12V battery 128 from discharging any further, the voltage detector and controller 134 opens the battery discharge switch 130 through the logic gate 218 and the switch inverter 220. The battery charge switch 126 is also closed to start charging the 12V battery 128 from the switch network input voltage 116.

On the other hand, if the power demand of the load 136 decreases, such as when the user switches off the second head light on the e-bike, the load driving voltage 124 may again rise above the load voltage threshold 230. The load voltage comparator 232 triggers to indicate that the switch network input voltage 116 is capable of driving the load 136. If the voltage 132 is below the battery full threshold 212, the battery full comparator 214 also triggers. The voltage detector and controller 134 closes the battery charge switch 126 to start charging the 12V battery 128 from the switch network input voltage 116. It also opens the battery discharge switch 130 so that only the switch network input voltage 116 is driving the load driving voltage 124.

Figure 3:
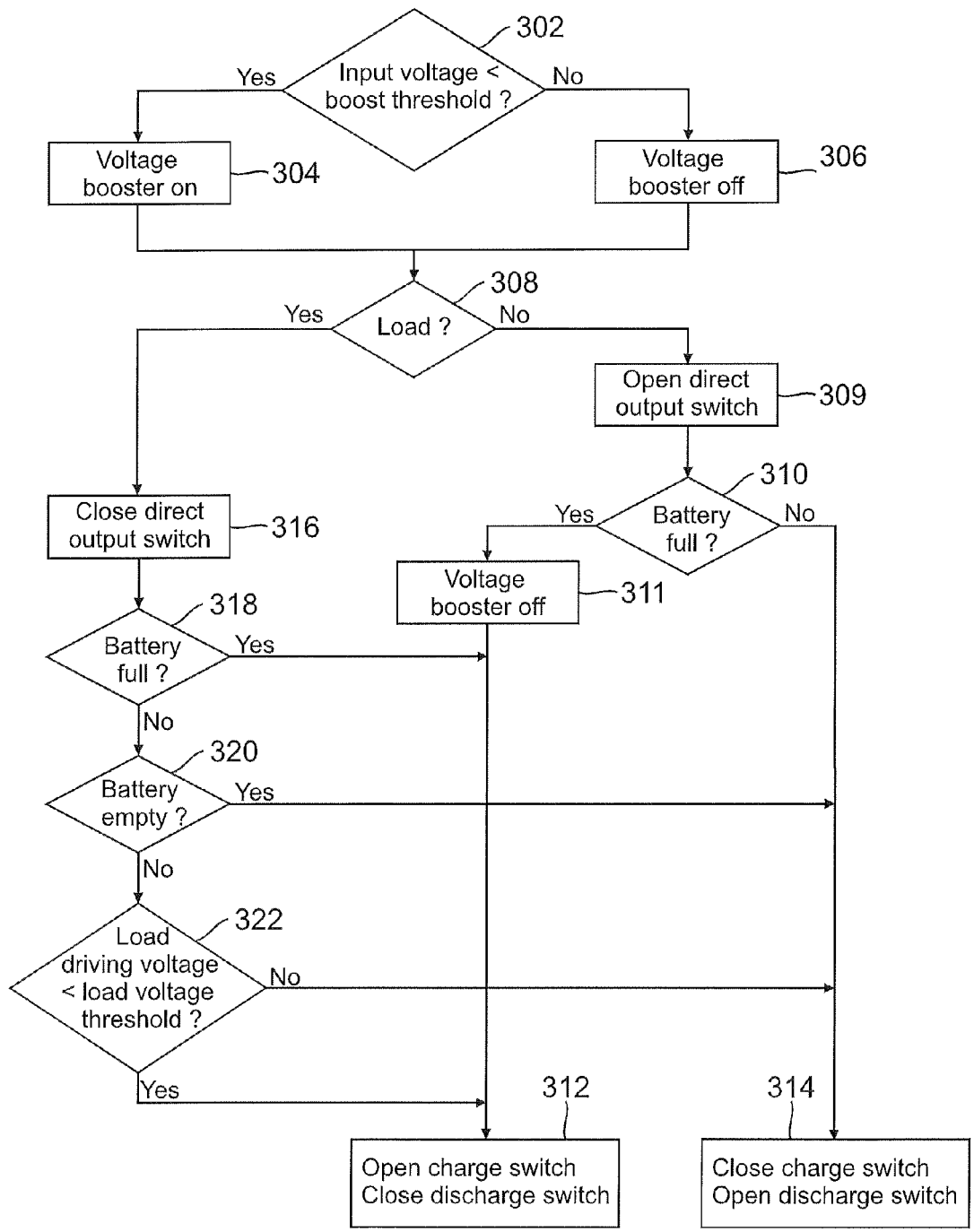
FIG. 3 is a flow chart of a DC power control method for use in the voltage detector and controller 134 of FIG. 1 according to one or more exemplary embodiments of the present disclosure.

FIG. 3 is a flow chart of a DC power control method for use in the voltage detector and controller 134 of FIG. 1 according to one or more exemplary embodiments of the present disclosure. In step 302, an input voltage is compared against a boost threshold to determine if the input voltage is to be boosted. The input voltage may be rectified from an AC power source voltage 104, or may be a DC power source voltage 113 of FIG. 1. In step 304, if the input voltage is less than the boost threshold, the DC power control method turns on the voltage booster 114 to boost the input voltage for use by the switch network 120 and may also open the voltage booster bypass switch 118 if it is present. Otherwise, in step 306, the DC power control method turns off the voltage booster 114 to use the input voltage as is for the switch network 120 and may also close the voltage booster bypass switch 118 if it is present.

In step 308, the DC power control method determines if there is a load. This determination may be made by comparing the load driving voltage 124 against a load present threshold. When there is no load, the DC power control method opens the direct output switch 122 to disconnect the load driving voltage 124 from the input voltage in step 309. The 12V battery 128 is further checked to see if it is fully charged in step 310. If the 12V battery 128 is fully charged, in step 311, the DC power control method turns off the voltage booster 114 if the voltage booster 114 is originally on and may also close the voltage booster bypass switch 118 if it is present. This is because the voltage booster 114 consumes power when it is on and since there is no load to draw power and the 12V battery 128 is already fully charged, there is no need to consume power to boost the input voltage. In step 312, the DC power control method also opens the battery charge switch 126 and closes the battery discharge switch 130 to stop the 12V battery 128 from charging any further. If step 310 determines that the 12V battery 128 is not fully charged, in step 314 the DC power control method closes the battery charge switch 126 and opens the battery discharged switch 130 to charge the 12V battery 128.

If in step 308 the DC power control method determines there is a load, the DC power control method closes the direct output switch 122 to drive the switch network input voltage 116 onto the load driving voltage 124 in step 316. Again, the DC power control method checks to see if the 12V battery 128 is fully charged in step 318. If the 12V battery 128 is fully charged, the DC power control method opens the battery charge switch 126 and closes the battery discharge switch 130 to stop the 12V battery 128 from charging any further in step 312. As a result, the switch network input voltage 116 is used only to drive the load, not to charge the 12V battery 128. If the 12V battery 128 is not fully charged, the DC power control method further checks to see if the 12V battery 128 is nearly drained in step 320. If the 12V battery 128 is nearly drained, the DC power control method closes the battery charge switch 126 and opens the battery discharge switch 130 to prevent the 12V battery 128 from discharging any further in step 314. Otherwise, the 12V battery 128 still has some power that may be used to drive the load if necessary.

In step 322, the DC power control method checks to see whether the 12V battery 128 should be discharged to supplement the power from the switch network input voltage 116 by checking to see if the load driving voltage 124 is below a load voltage threshold. If the load driving voltage 124 is below the load voltage threshold, the switch network input voltage 116 does not have sufficient power to drive the load. The DC power control method opens the battery charge switch 126 and closes the battery discharge switch 130 in step 312 to drive battery voltage 132 from the 12V battery 128 onto the load. Otherwise, if the load driving voltage 124 is not below the load voltage threshold, the switch network input voltage 116 is sufficient to drive the load. The DC power control method closes the battery charge switch 126 and opens the battery discharge switch 130 in step 314 so that the only the switch network input voltage 116 drives the load.

The DC power control system 100 of FIG. 1 uses AC power 104 generated from the hub generator 102 mounted on the wheel hub of an e-bike to drive the load 136 and, if there is power available, to charge the 12V battery 128. It is desirable to allow a rider of the e-bike to be able to easily attach and detach the DC power control system 100 to and from the e-bike. For example, a rider may want to remove the DC power control system 100 from the e-bike to plug it into a wall outlet to charge the 12V battery 128 from the AC grid, or the rider may simply want to remove it for safe keeping. To facilitate the removal and reattachment of the DC power control system 100, the DC power control system 100 may be packaged into a fixed controller base that is affixed to the e-bike and a removable controller housing that may be mounted onto and dismounted from the fixed base.

Figure 4:
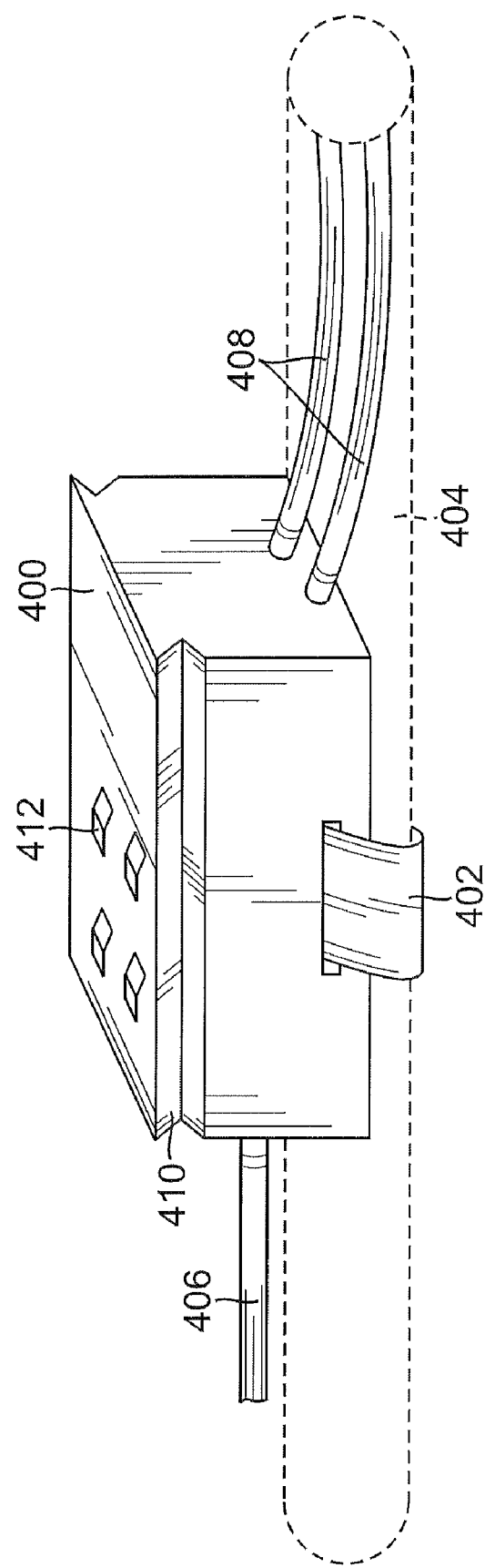
FIG. 4 is a perspective view of a fixed controller base 400 of a DC power control system 100 of FIG. 1 according to one or more exemplary embodiments of the present disclosure sclosure.

FIG. 4 is a perspective view of a fixed controller base 400 of a DC power control system 100 of FIG. 1 according to one or more exemplary embodiments of the present disclosure. The fixed controller base 400 houses the connections to the hub generator 102, to the load 136, and provides a base for mounting and dismounting the removable controller housing. A base clip 402 protrudes from the fixed controller base 400 for fastening the fixed controller base 400 to a frame 404 of the e-bike. On one end of the fixed controller base 400 a power input cable 406 connects to the fixed controller base 400 to bring in AC power source voltage 104 from the hub generator 102 of FIG. 1. On the other end of the fixed controller base 400 one or more power output cables 408 connect to the fixed base 400 to distribute the load driving voltage 124 to the load 136. For example, the power output cables 404 may supply 12V DC voltage to the head lamp and the tail lamp of the e-bike. Along top edges of two opposing sides of the fixed controller base 400 is a base groove 410 that runs the length of the two sides. The base groove 410 provides a V-groove for mounting the removable controller housing of the DC power control system 100. Alternatively, a socket, a screw-in receptacle, or other types of structure may be used to receive the removable controller housing. Protruding from the top surface of the fixed controller base 400 are base contact springs 412 that electrically connect the fixed controller base 400 and the removable controller housing. The base contact springs 412 connect the AC power source voltage 104 from the power input cable 406 of the fixed controller base 400 to the power source rectifier 106 housed in the removable controller housing. The base contact springs 412 also connect the load driving voltage 124 from the removable controller housing to the power output cables 408 to supply power to the load 136.

Figure 5:
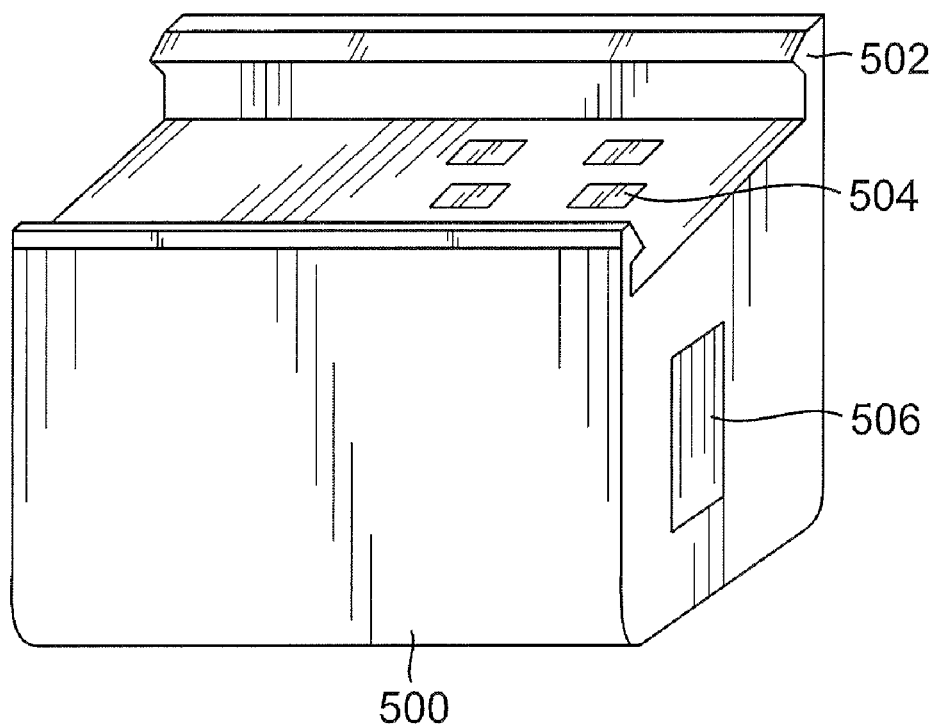
FIG. 5 is a perspective view of a removable controller housing 500 of a DC power control system 100 of FIG. 1 according to one or more exemplary embodiments of the present disclosure.

FIG. 5 is a perspective view of a removable controller housing 500 of a DC power control system 100 of FIG. 1 according to one or more exemplary embodiments of the present disclosure. The removable controller housing 500 houses the power source rectifier 106, the voltage booster 114, the voltage booster bypass switch 118, the switch network 120, the 12V battery 128, the voltage detector and controller 134, and the voltage converter 138. Protruding from the top edges along two opposing sides of the removable controller housing 500 is a controller housing protrusion 502. The controller housing protrusion 502 slides along the base groove 410 of the fixed controller base 400 for mounting and dismounting the removable controller housing 500 from the fixed controller base 400. Alternatively, a screw-on assembly or other types of structure may be used to mount the removable controller housing 500 on the fixed controller base 400. When mounted, the controller housing contacts 504 electrically connect with their respective base contact springs 412 of the fixed controller base 400. In addition, there is an auxiliary output connector 506 for providing the voltage converter output voltage 140 from the output of the voltage converter 138 to the auxiliary load 142. The auxiliary output connector 506 may be an USB connector into which a user may plug in a charger for a cell phone, a GPS, or other portable devices.

Although exemplary embodiments of the present disclosure have been described, the exemplary embodiments illustrate, but do not limit the invention. It should be understood that embodiments of the present disclosure should not be limited to these exemplary embodiments but numerous modifications and variations may be made by one of ordinary skill in the art and be included within the spirit and scope of the present disclosure as hereinafter claimed. For example, any type of element that functions as a switch can be used for switches 118, 122, 126, and 130. There may be more than one 12V battery or the battery may be of a different voltage. In addition, the steps in the DC control method of FIG. 3 may be executed in different sequence or combined.

The invention claimed is:

1. A DC power control system comprising:
   a voltage booster adapted to selectively boost a DC voltage to provide a network input voltage with a boosted voltage;
   a power distribution network adapted to distribute power from the network input voltage to a load voltage and to a battery voltage, and to supplement the power distributed to the load voltage with power from the battery voltage;
   a control circuit adapted to compare the DC voltage to an adjustable boost threshold to control the voltage booster, and further adapted to detect the load voltage and the battery voltage to manage the distribution of power from the network input voltage to the load voltage and the battery voltage and to manage the distribution of power from the battery voltage; and
   a battery coupled to the battery voltage.

2. The DC power control system of claim 1, wherein the power distribution network comprises:
   a direct output switch coupled between the network input voltage and the load voltage;
   a battery charge switch coupled between the network input voltage and the battery voltage; and
   a battery discharge switch coupled between the battery voltage and the load voltage;
   and wherein the control circuit is further adapted to control the direct output switch, the battery charge switch, and the battery discharge switch.

3. The DC power control system of claim 1, further comprising a power source rectifier adapted to generate the DC voltage from an AC voltage.

4. The DC power control system of claim 1, further comprising a voltage converter adapted to convert the load voltage to a different voltage.

5. The DC power control system of claim 1, wherein the control circuit is adapted to enable the voltage booster with a duty cycle of a periodic gating signal.

6. The DC power control system of claim 2, wherein the control circuit is adapted to compare the network input voltage with a load present threshold to control a transfer of power from the network input voltage to the load voltage through the direct output switch.

7. The DC power control system of claim 2, wherein the control circuit is adapted to compare the battery voltage with a battery full threshold to control a transfer of power from the network input voltage to the battery through the battery charge switch and to control a transfer of power from the battery to the load voltage through the battery discharge switch.

8. The DC power control system of claim 2, wherein the control circuit is adapted to compare the battery voltage with a battery empty threshold to control a transfer of power from the network input voltage to the battery through the battery charge switch and to control a transfer of power from the battery to the load voltage through the battery discharge switch.

9. The DC power control system of claim 2, wherein the control circuit is adapted to compare the load voltage with a load voltage threshold to control a transfer of power from the network input voltage to the battery through the battery charge switch and to control a transfer of power from the battery to the load voltage through the battery discharge switch.

10. The DC power control system of claim 2, further comprising a voltage booster bypass switch adapted to select between the DC voltage and the boosted voltage to provide the network input voltage.

11. A DC power control method comprising:
selectively boosting a DC voltage when the DC voltage is less than an adjustable boost threshold to provide an input voltage;
distributing power from the input voltage to drive a load voltage and to charge a battery;
distributing power from the battery to supplement power distributed to the load voltage from the input voltage; and
detecting the load voltage and a battery voltage of the battery to manage the power distributed from the input voltage to the load voltage and to the battery, and to manage the power distributed to the load voltage from the input voltage and from the battery.

12. The DC power control method of claim 11, further comprising rectifying an AC voltage to generate the DC voltage.

13. The DC power control method of claim 11, further comprising converting the load voltage to a different voltage.

14. The DC power control method of claim 11, wherein said selectively boosting the DC voltage comprises enabling boosting of the DC voltage with a duty cycle of a period gating signal.

15. The DC power control method of claim 11, wherein said selectively boosting the DC voltage comprises disabling boosting of the DC voltage when there is no load and the voltage of the battery indicates a full battery even when the DC voltage is less than the boost threshold.

16. The DC power control method of claim 11, wherein said detecting the load voltage and a battery voltage of the battery to manage the power distributed to the load voltage from the input voltage and from the battery comprises supplying power from the battery when the battery voltage indicates a full battery even when the power from the input voltage is sufficient to drive the load voltage.

17. The DC power control method of claim 11, wherein said detecting the load voltage and a battery voltage of the battery to manage the power distributed from the input voltage to the load voltage and to the battery, and to manage the power distributed to the load voltage from the input voltage and from the battery comprises discontinue supplying power from the battery and start supplying power from the input voltage to charge the battery when the battery voltage indicates a substantially empty battery even when the power from the input voltage is insufficient to drive the load voltage.

18. The DC power control method of claim 11, wherein said detecting the load voltage and a battery voltage of the battery to manage the power distributed from the input voltage to the load voltage and to the battery, and to manage the power distributed to the load voltage from the input voltage and from the battery comprises supplementing the power from the input voltage to the load voltage with power from the battery when the power from the input voltage is insufficient to drive the load voltage.

* * * * *